United States Patent
Gutierrez et al.

(10) Patent No.: US 9,625,673 B2
(45) Date of Patent: *Apr. 18, 2017

(54) AUTOFOCUS CAMERA SYSTEMS AND METHODS

(71) Applicant: DIGITALOPTICS CORPORATION MEMS, San Jose, CA (US)

(72) Inventors: Roman C. Gutierrez, Arcadia, CA (US); Robert J. Calvet, Pasadena, CA (US); Darrell Harrington, Pasadena, CA (US); Guiqin Wang, Arcadia, CA (US); Kumaraswamy Jayaraj, San Diego, CA (US)

(73) Assignee: DIGITALOPTICS CORPORATION MEMS, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/076,383

(22) Filed: Mar. 21, 2016

(65) Prior Publication Data

US 2016/0202447 A1    Jul. 14, 2016

Related U.S. Application Data

(60) Continuation of application No. 14/201,702, filed on Mar. 7, 2014, now Pat. No. 9,291,875, which is a
(Continued)

(51) Int. Cl.
*G03B 13/34*    (2006.01)
*G03B 3/10*     (2006.01)
(Continued)

(52) U.S. Cl.
CPC ............. *G02B 7/09* (2013.01); *G02B 7/08* (2013.01); *G02B 13/001* (2013.01); *G03B 3/10* (2013.01);
(Continued)

(58) Field of Classification Search
USPC ................... 396/133; 359/694, 824
See application file for complete search history.

(56) References Cited

U.S. PATENT DOCUMENTS 2,033,596 A    3/1936  Sussman
2,173,942 A    9/1939  Burritt et al.
(Continued)

FOREIGN PATENT DOCUMENTS

CN    101410751 A    2/2010
EP    1987393 A2     1/2010
(Continued)

OTHER PUBLICATIONS

Won I. Jang et al. "Fabrication of MEMS Devices by Using Anhydrous HF Gas-Phase Etching with Alcoholic Vaper"; IOP Publishing 2002, pp. 297-306.
(Continued)

*Primary Examiner* — Clayton E Laballe
*Assistant Examiner* — Warren K Fenwick
(74) *Attorney, Agent, or Firm* — Larry E. Henneman, Jr.; Gregory P. Gibson; Henneman & Associates, PLC

(57) ABSTRACT

A method for focusing a miniature camera includes providing a current through a coil, moving a lens of a camera based on the current to adjust a focus of the camera, and limiting movement of the lens along an optical path of the camera.

21 Claims, 11 Drawing Sheets

Related U.S. Application Data continuation of application No. 13/732,276, filed on Dec. 31, 2012, now Pat. No. 8,682,156, which is a continuation of application No. 13/225,257, filed on Sep. 2, 2011, now Pat. No. 8,346,074, which is a continuation of application No. 12/873,943, filed on Sep. 1, 2010, now Pat. No. 8,014,662, which is a division of application No. 11/361,608, filed on Feb. 24, 2006, now Pat. No. 7,813,634, which is a continuation-in-part of application No. 11/268,849, filed on Nov. 8, 2005, now Pat. No. 7,646,969, and a continuation-in-part of application No. 11/269,304, filed on Nov. 8, 2005, now Pat. No. 7,555,210.

(60) Provisional application No. 60/657,261, filed on Feb. 28, 2005, provisional application No. 60/657,261, filed on Feb. 28, 2005.

(51) Int. Cl.
| | | |
|---|---|---|
| G02B 7/09 | | (2006.01) |
| G02B 7/08 | | (2006.01) |
| G02B 13/00 | | (2006.01) |
| G03B 17/02 | | (2006.01) |
| G03B 13/36 | | (2006.01) |
| H04N 5/225 | | (2006.01) |

(52) U.S. Cl.
CPC ............ *G03B 13/36* (2013.01); *G03B 17/02* (2013.01); *H04N 5/2253* (2013.01); *H04N 5/2254* (2013.01); *H04N 5/2252* (2013.01); *Y10T 29/4902* (2015.01)

(56) References Cited

U.S. PATENT DOCUMENTS

| | | | |
|---|---|---|---|
| 2,478,336 A | 8/1949 | Stein et al. | |
| 3,065,671 A | 11/1962 | Walter et al. | |
| 3,153,690 A | 10/1964 | Kuyt et al. | |
| 3,455,221 A | 7/1969 | Reekie | |
| 3,573,367 A | 4/1971 | LaRue, Jr. | |
| 3,715,149 A | 2/1973 | Freeland | |
| 3,817,601 A | 6/1974 | Colaiace et al. | |
| 4,027,968 A | 6/1977 | Spence-Bate | |
| 4,051,199 A | 9/1977 | Udipi et al. | |
| 4,053,211 A | 10/1977 | Momiyama | |
| 4,100,555 A | 7/1978 | Johnson | |
| 4,140,381 A | 2/1979 | Douglas | |
| 4,307,951 A | 12/1981 | Saito et al. | |
| 4,331,396 A | 5/1982 | Nyman | |
| 4,383,565 A | 5/1983 | Denmat | |
| 4,384,778 A | 5/1983 | Lee et al. | |
| 4,408,857 A | 10/1983 | Frank | |
| 4,573,780 A | 3/1986 | Sato et al. | |
| 4,650,307 A | 3/1987 | Capobianco et al. | |
| 4,676,605 A * | 6/1987 | Toda | G02B 7/04 359/696 |
| 4,696,692 A | 9/1987 | Schmitt | |
| 4,716,432 A | 12/1987 | Stephany | |
| 4,721,357 A | 1/1988 | Kovalchick et al. | |
| 4,855,982 A * | 8/1989 | Orlicki | G11B 7/0925 369/44.16 |
| 4,946,265 A | 8/1990 | Shimizu et al. | |
| 4,948,219 A | 8/1990 | Seino et al. | |
| 5,004,205 A | 4/1991 | Brown et al. | |
| 5,005,948 A | 4/1991 | Takahashi et al. | |
| 5,062,682 A | 11/1991 | Marazzi | |
| 5,079,576 A | 1/1992 | Kodaira | |
| 5,128,808 A | 7/1992 | Dosaka | |
| 5,131,745 A | 7/1992 | Whitney et al. | |
| 5,142,318 A | 8/1992 | Taniguchi et al. | |
| 5,163,108 A | 11/1992 | Armiento et al. | |
| 5,202,706 A | 4/1993 | Hasegawa | |
| 5,214,735 A | 5/1993 | Henneberger et al. | |
| 5,249,082 A | 9/1993 | Newman | |
| 5,262,867 A | 11/1993 | Kojima | |
| 5,266,988 A | 11/1993 | Washisu | |
| 5,285,313 A | 2/1994 | Kobayashi et al. | |
| 5,289,318 A * | 2/1994 | Sekine | G02B 7/08 359/813 |
| 5,383,168 A | 1/1995 | O'Brien et al. | |
| 5,394,498 A | 2/1995 | Hinterlong et al. | |
| 5,412,747 A | 5/1995 | Matsuoka et al. | |
| 5,461,515 A | 10/1995 | Sorce | |
| 5,463,709 A | 10/1995 | Terao et al. | |
| 5,469,893 A | 11/1995 | Caveney et al. | |
| 5,471,100 A | 11/1995 | Sakamoto et al. | |
| 5,507,082 A | 4/1996 | Goda | |
| 5,537,262 A | 7/1996 | Aoki et al. | |
| 5,550,942 A | 8/1996 | Sheem | |
| 5,552,209 A | 9/1996 | McCutcheon | |
| 5,566,262 A | 10/1996 | Yamane et al. | |
| 5,589,989 A | 12/1996 | Estelle et al. | |
| 5,618,094 A | 4/1997 | Lee | |
| 5,677,975 A | 10/1997 | Burek et al. | |
| 5,678,944 A | 10/1997 | Slocum et al. | |
| 5,684,640 A | 11/1997 | Tanaka et al. | |
| 5,701,381 A | 12/1997 | Saurenbach et al. | |
| 5,706,120 A | 1/1998 | O'Brien et al. | |
| 5,733,024 A | 3/1998 | Slocum et al. | |
| 5,748,827 A | 5/1998 | Holl et al. | |
| 5,768,038 A | 6/1998 | Emura | |
| 5,768,464 A | 6/1998 | Leonard | |
| 5,803,402 A | 9/1998 | Krumweide et al. | |
| 5,821,764 A | 10/1998 | Slocum et al. | |
| 5,822,625 A | 10/1998 | Leidig et al. | |
| 5,825,559 A | 10/1998 | Johnson et al. | |
| 5,828,503 A * | 10/1998 | Kaneda | G02B 7/102 359/824 |
| 5,835,652 A | 11/1998 | Yagi et al. | |
| 5,841,250 A | 11/1998 | Korenage et al. | |
| 5,847,887 A | 12/1998 | Ogura et al. | |
| 5,857,049 A | 1/1999 | Beranek et al. | |
| 5,897,226 A | 4/1999 | Okada et al. | |
| 5,900,995 A * | 5/1999 | Akada | G02B 7/102 359/696 |
| 5,905,831 A | 5/1999 | Boudreau et al. | |
| 5,907,650 A | 5/1999 | Sherman et al. | |
| 5,913,002 A | 6/1999 | Jiang | |
| 5,915,678 A | 6/1999 | Slocum et al. | |
| 5,926,326 A | 7/1999 | Fischer et al. | |
| 5,944,152 A | 8/1999 | Lindsay et al. | |
| 5,955,798 A | 9/1999 | Ishiyama et al. | |
| 5,964,397 A | 10/1999 | Dautartas | |
| 6,033,131 A | 3/2000 | Ghosh | |
| 6,060,336 A | 5/2000 | Wan | |
| 6,071,143 A | 6/2000 | Barthel et al. | |
| 6,078,438 A | 6/2000 | Shibata et al. | |
| 6,085,007 A | 7/2000 | Jiang et al. | |
| 6,085,014 A | 7/2000 | Kajiwara | |
| 6,115,552 A | 9/2000 | Kaneda | |
| 6,118,917 A | 9/2000 | Lee et al. | |
| 6,127,254 A | 10/2000 | Diebold et al. | |
| 6,137,580 A | 10/2000 | Gelbart | |
| 6,157,100 A | 12/2000 | Mielke | |
| 6,157,759 A | 12/2000 | Seo et al. | |
| 6,159,385 A | 12/2000 | Yao et al. | |
| 6,160,672 A | 12/2000 | Chan et al. | |
| 6,170,157 B1 | 1/2001 | Munk et al. | |
| 6,188,195 B1 | 2/2001 | Lee | |
| 6,195,407 B1 | 2/2001 | Dobbs et al. | |
| 6,205,267 B1 | 3/2001 | Aksyuk et al. | |
| 6,208,809 B1 | 3/2001 | Kanai et al. | |
| 6,226,460 B1 | 5/2001 | Hino et al. | |
| 6,249,636 B1 | 6/2001 | Daoud | |
| 6,259,508 B1 | 7/2001 | Shigematsu | |
| 6,268,970 B1 | 7/2001 | Ito et al. | |
| 6,271,606 B1 | 8/2001 | Hazelton | |
| 6,273,783 B1 | 8/2001 | Kim | |
| 6,274,994 B2 | 8/2001 | Tsutsui | |
| 6,278,844 B1 | 8/2001 | Takeshita | |
| 6,314,630 B1 | 11/2001 | Munk et al. | |

(56) References Cited

U.S. PATENT DOCUMENTS

| | | |
|---|---|---|
| 6,349,003 B1 | 2/2002 | Ko |
| 6,374,022 B1 | 4/2002 | Parmigiani et al. |
| 6,392,220 B1 | 5/2002 | Slater et al. |
| 6,400,516 B1 | 6/2002 | Spinali |
| 6,418,330 B1 | 7/2002 | Lee |
| 6,504,958 B1 | 1/2003 | Suzuki |
| 6,535,311 B1 | 3/2003 | Lindquist |
| 6,539,131 B1 | 3/2003 | Gill et al. |
| 6,546,182 B2 | 4/2003 | Calvet et al. |
| 6,547,402 B2 | 4/2003 | Masuda |
| 6,603,930 B2 | 8/2003 | Suzuki |
| 6,606,444 B2 | 8/2003 | Harman et al. |
| 6,617,657 B1 | 9/2003 | Yao et al. |
| 6,618,211 B2 | 9/2003 | Yumiki et al. |
| 6,636,653 B2 | 10/2003 | Miracky et al. |
| 6,643,457 B2 | 11/2003 | Chen |
| 6,661,955 B1 | 12/2003 | Calvet et al. |
| 6,661,962 B1 | 12/2003 | Calvet et al. |
| 6,664,664 B2 | 12/2003 | Botos et al. |
| 6,674,585 B1 | 1/2004 | Calvet et al. |
| 6,683,654 B1 | 1/2004 | Haijima |
| 6,738,198 B2 | 5/2004 | Kashiwaba et al. |
| 6,741,914 B1 | 5/2004 | Tze Ming Pang |
| 6,755,540 B1 | 6/2004 | Runco |
| 6,756,247 B1 | 6/2004 | Davis et al. |
| 6,788,891 B1 | 9/2004 | Mitsugi |
| 6,803,682 B1 | 10/2004 | Thirunarayan et al. |
| 6,832,725 B2 | 12/2004 | Gardiner et al. |
| 6,850,675 B1 | 2/2005 | Calvet et al. |
| 6,856,469 B2 * | 2/2005 | Yoneyama ......... H02K 41/0356 310/12.04 |
| 6,867,812 B2 | 3/2005 | Iiizumi et al. |
| 6,914,635 B2 * | 7/2005 | Ostergard ............. G02B 7/102 348/240.3 |
| 6,958,777 B1 | 10/2005 | Pine |
| 7,031,071 B2 | 4/2006 | Nishioka |
| 7,095,485 B2 | 8/2006 | Hol et al. |
| 7,110,188 B2 | 9/2006 | Matsui et al. |
| 7,113,688 B2 | 9/2006 | Calvet et al. |
| 7,116,608 B2 | 10/2006 | Jun et al. |
| 7,146,097 B2 | 12/2006 | Kameyama |
| 7,154,684 B2 | 12/2006 | Shibazaki |
| 7,209,294 B2 | 4/2007 | Takahashi |
| 7,212,358 B2 | 5/2007 | Mattsson et al. |
| 7,265,789 B2 | 9/2007 | Takada |
| 7,266,272 B1 | 9/2007 | Calvet et al. |
| 7,283,315 B2 | 10/2007 | Noguchi |
| 7,295,388 B2 | 11/2007 | Shyu et al. |
| 7,298,564 B2 | 11/2007 | Rouvinen et al. |
| 7,345,827 B1 | 3/2008 | Tang et al. |
| 7,356,252 B2 | 4/2008 | Wang |
| 7,359,130 B1 | 4/2008 | Calvet |
| 7,359,131 B1 | 4/2008 | Gutierrez et al. |
| 7,386,323 B2 | 6/2008 | Chen et al. |
| 7,403,344 B2 | 7/2008 | Xu et al. |
| 7,411,625 B2 * | 8/2008 | Lee ....................... G02B 7/102 348/340 |
| 7,435,612 B2 | 10/2008 | Xiao et al. |
| 7,477,842 B2 | 1/2009 | Gutierrez |
| 7,495,852 B2 | 2/2009 | Gutierrez |
| 7,515,362 B1 | 4/2009 | Gutierrez et al. |
| 7,556,775 B2 | 7/2009 | McGill et al. |
| 7,565,070 B1 | 7/2009 | Gutierrez |
| 7,570,882 B2 | 8/2009 | Gutierrez et al. |
| 7,613,389 B2 | 11/2009 | Suzuki et al. |
| 7,660,056 B1 | 2/2010 | Tang et al. |
| 7,697,829 B1 | 4/2010 | Gutierrez et al. |
| 7,729,603 B2 | 6/2010 | Xu et al. |
| 7,747,155 B1 | 6/2010 | Gutierrez |
| 7,769,284 B2 | 8/2010 | Tang et al. |
| 7,792,421 B1 | 9/2010 | Tong et al. |
| 7,838,322 B1 | 11/2010 | Vargo et al. |
| 8,090,252 B1 | 1/2012 | Tang et al. |
| 8,184,967 B2 | 5/2012 | Tang et al. |
| 8,391,700 B1 | 3/2013 | Gutierrez et al. |
| 8,682,156 B2 * | 3/2014 | Gutierrez ................ G02B 7/08 396/133 |
| 2001/0010557 A1 | 8/2001 | Lizumi et al. |
| 2001/0026266 A1 | 10/2001 | Schena et al. |
| 2001/0048557 A1 | 12/2001 | Akami et al. |
| 2002/0036832 A1 | 3/2002 | Schultz et al. |
| 2002/0075393 A1 | 6/2002 | Kim et al. |
| 2002/0125789 A1 | 9/2002 | Brandt |
| 2002/0142798 A1 | 10/2002 | Miyake |
| 2002/0191098 A1 | 12/2002 | Oshima |
| 2003/0043289 A1 | 3/2003 | Konno |
| 2003/0062422 A1 | 4/2003 | Fateley et al. |
| 2003/0067710 A1 | 4/2003 | Kovinskaya et al. |
| 2003/0076421 A1 * | 4/2003 | Dutta ................. H04N 5/23248 348/208.11 |
| 2003/0161054 A1 | 8/2003 | Sato |
| 2003/0197914 A1 | 10/2003 | Cox et al. |
| 2003/0213135 A1 | 11/2003 | Kaneko et al. |
| 2004/0036942 A1 | 2/2004 | Abu-Ageel |
| 2004/0066494 A1 | 4/2004 | Lee et al. |
| 2004/0076416 A1 | 4/2004 | Mihara |
| 2004/0094086 A1 | 5/2004 | Shimaoka et al. |
| 2004/0110488 A1 | 6/2004 | Komsi |
| 2004/0174614 A1 * | 9/2004 | Hovanky ................. G03B 3/10 359/694 |
| 2004/0183633 A1 | 9/2004 | Shen et al. |
| 2004/0189862 A1 | 9/2004 | Gustavsson et al. |
| 2004/0201773 A1 * | 10/2004 | Ostergard .............. G02B 7/102 348/374 |
| 2004/0228009 A1 | 11/2004 | Kamo et al. |
| 2005/0002665 A1 | 1/2005 | Ito et al. |
| 2005/0024748 A1 | 2/2005 | Amanai |
| 2005/0046736 A1 | 3/2005 | Kuchimaru |
| 2005/0052759 A1 | 3/2005 | Ito et al. |
| 2005/0068444 A1 | 3/2005 | Oshima et al. |
| 2005/0094284 A1 | 5/2005 | Takahashi |
| 2005/0111112 A1 | 5/2005 | Masuda |
| 2005/0126287 A1 * | 6/2005 | Malametz ............... G01P 15/08 73/504.12 |
| 2005/0128341 A1 | 6/2005 | Murakami |
| 2005/0129384 A1 * | 6/2005 | Nishida ................ H04N 5/2254 385/147 |
| 2005/0134141 A1 | 6/2005 | Savic et al. |
| 2005/0225824 A1 | 10/2005 | Bell et al. |
| 2005/0249487 A1 * | 11/2005 | Gutierrez ............... G02B 7/102 396/85 |
| 2005/0280904 A1 | 12/2005 | Wang et al. |
| 2006/0029379 A1 | 2/2006 | Butterworth et al. |
| 2006/0033938 A1 | 2/2006 | Kopf et al. |
| 2006/0038103 A1 | 2/2006 | Helmbrecht |
| 2006/0054782 A1 | 3/2006 | Olsen et al. |
| 2006/0109668 A1 | 5/2006 | Schmieder et al. |
| 2006/0110998 A1 | 5/2006 | Takenishi et al. |
| 2006/0113594 A1 | 6/2006 | Sakurada et al. |
| 2006/0192858 A1 | 8/2006 | Calvet |
| 2006/0192885 A1 | 8/2006 | Calvet et al. |
| 2006/0193620 A1 | 8/2006 | Harrington et al. |
| 2006/0198622 A1 | 9/2006 | Xu et al. |
| 2006/0204242 A1 | 9/2006 | Gutierrez et al. |
| 2006/0209012 A1 | 9/2006 | Hagood |
| 2006/0219006 A1 | 10/2006 | Nasiri et al. |
| 2006/0245085 A1 | 11/2006 | Lee et al. |
| 2006/0250325 A1 | 11/2006 | Hagood et al. |
| 2007/0220882 A1 | 9/2007 | Culpepper |
| 2008/0029708 A1 | 2/2008 | Olsen et al. |
| 2008/0044172 A1 | 2/2008 | Tang |
| 2009/0015706 A1 | 1/2009 | Singh |
| 2013/0077948 A1 * | 3/2013 | Gutierrez ............... B81B 7/0054 396/133 |

FOREIGN PATENT DOCUMENTS

| | | |
|---|---|---|
| JP | 2000241694 A * | 9/2000 |
| JP | 2000-275697 A | 10/2000 |
| JP | 2003-226300 A | 8/2003 |
| JP | 2005-092004 A | 4/2005 |
| JP | 2009 527803 A | 7/2009 |
| KR | 2008 0096845 A | 11/2008 |

(56) References Cited

FOREIGN PATENT DOCUMENTS

| TW | I 437357 B | 5/2014 |
|---|---|---|
| TW | I 484245 B | 5/2015 |
| WO | WO 87/02479 | 4/1987 |
| WO | WO 2006/093934 | 9/2006 |
| WO | WO 2007/101038 | 9/2007 |
| WO | WO 2008/067148 | 6/2008 |

OTHER PUBLICATIONS

TW Application No. 96106613, Office Action dated Oct. 8, 2013 (English translation).
TW Application No. 96106613, Office Action dated Jul. 18, 2014 (Non-English translation).
PCT Application No. PCT/US06/07024, International Search Report and Written Opinion dated Nov. 28, 2007.
PCT Application No. PCT/US06/07024, International Preliminary Report on Patentability dated Jul. 15, 2008.
U.S. Appl. No. 10/067,466, Restriction Requirement dated Sep. 10, 2003.
U.S. Appl. No. 10/067,466, Office Action dated Nov. 14, 2003.
U.S. Appl. No. 10/067,466, Office Action dated Apr. 14, 2004.
U.S. Appl. No. 10/067,466, Notice of Allowance dated Sep. 27, 2004.
U.S. Appl. No. 11/037,883, Office Action dated May 27, 2005.
U.S. Appl. No. 11/037,883, Office Action dated Oct. 27, 2005.
U.S. Appl. No. 11/037,883, Notice of Allowance dated May 22, 2006.
U.S. Appl. No. 11/041,122, Restriction Requirement dated Jul. 24, 2006.
U.S. Appl. No. 11/041,122, Office Action dated Sep. 28, 2006.
U.S. Appl. No. 11/041,122, Notice of Allowance dated May 3, 2007.
U.S. Appl. No. 11/364,100, Office Action dated Apr. 12, 2007.
U.S. Appl. No. 11/364,100, Notice of Allowance dated Nov. 29, 2007.
U.S. Appl. No. 11/550,119, Office Action dated May 21, 2009.
U.S. Appl. No. 11/550,119, Office Action dated Oct. 12, 2009.
U.S. Appl. No. 11/550,119, Notice of Allowance dated May 10, 2010.
U.S. Appl. No. 11/219,137, Office Action dated Apr. 2, 2008.
U.S. Appl. No. 11/219,137, Office Action dated Nov. 6, 2008.
U.S. Appl. No. 11/219,259, Office Action dated Jun. 5, 2008.
U.S. Appl. No. 11/219,259, Office Action dated Dec. 18, 2008.
U.S. Appl. No. 11/219,259, Office Action dated Mar. 31, 2009.
U.S. Appl. No. 11/219,410, Office Action dated Sep. 21, 2007.
U.S. Appl. No. 11/219,410, Restriction Requirement dated May 30, 2008.
U.S. Appl. No. 11/219,410, Office Action dated Nov. 25, 2008.
U.S. Appl. No. 11/219,410, Notice of Allowance dated Jun. 30, 2009.
U.S. Appl. No. 11/263,149, Office Action dated Jun. 11, 2008.
U.S. Appl. No. 11/263,149, Office Action dated Nov. 24, 2008.
U.S. Appl. No. 11/263,149, Office Action dated Apr. 7, 2009.
U.S. Appl. No. 11/391,871, Office Action dated Jul. 17, 2008.
U.S. Appl. No. 11/391,871, Office Action dated Nov. 17, 2008.
U.S. Appl. No. 11/391,871, Notice of Allowance Mar. 30, 2009.
U.S. Appl. No. 11/263,152, Restriction Requirement dated Dec. 29, 2006.
U.S. Appl. No. 11/263,152, Office Action dated May 16, 2007.
U.S. Appl. No. 11/263,152, Office Action dated Dec. 17, 2007.
U.S. Appl. No. 11/263,152, Office Action dated Jul. 17, 2008.
U.S. Appl. No. 11/263,152, Notice of Allowance dated Dec. 30, 2008.
U.S. Appl. No. 12/353,728, Restriction Requirement dated Jun. 26, 2009.
U.S. Appl. No. 12/353,728, Office Action dated Sep. 19, 2009.
U.S. Appl. No. 12/353,728, Notice of Allowance dated Feb. 17, 2010.
U.S. Appl. No. 11/263,153, Office Action dated Mar. 27, 2007.
U.S. Appl. No. 11/263,153, Office Action dated Nov. 23, 2007.
U.S. Appl. No. 11/263,153, Notice of Allowance dated Apr. 9, 2008.
U.S. Appl. No. 11/365,047, Restriction Requirement dated Aug. 11, 2008.
U.S. Appl. No. 11/365,047, Restriction Requirement dated Dec. 24, 2008.
U.S. Appl. No. 11/365,047, Office Action dated May 13, 2009.
U.S. Appl. No. 11/365,047, Office Action dated Dec. 8, 2009.
U.S. Appl. No. 11/365,047, Notice of Allowance dated Jul. 9, 2010.
U.S. Appl. No. 11/485,812, Office Action dated Apr. 6, 2009.
U.S. Appl. No. 11/485,812, Office Action dated Jul. 31, 2009.
U.S. Appl. No. 11/485,812, Notice of Allowance dated Dec. 3, 2009.
U.S. Appl. No. 11/364,099, Restriction Requirement dated Apr. 11, 2006.
U.S. Appl. No. 11/364,099, Office Action dated May 23, 2006.
U.S. Appl. No. 11/364,099, Office Action dated Oct. 25, 2006.
U.S. Appl. No. 11/364,099, Advisory Action dated Feb. 8, 2007.
U.S. Appl. No. 11/364,099, Office Action dated May 7, 2007.
U.S. Appl. No. 11/364,099, Notice of Allowance dated Oct. 22, 2007.
U.S. Appl. No. 12/030,704, Office Action dated Jul. 21, 2008.
U.S. Appl. No. 12/030,704, Office Action dated Mar. 17, 2009.
U.S. Appl. No. 12/030,704, Notice of Allowance dated Nov. 30, 2009.
U.S. Appl. No. 11/511,001, Restriction Requirement dated Aug. 13, 2007.
U.S. Appl. No. 11/511,001, Office Action dated Aug. 28, 2007.
U.S. Appl. No. 11/511,001, Notice of Allowance dated Nov. 29, 2007.
U.S. Appl. No. 11/847,547, Office Action dated Jan. 29, 2008.
U.S. Appl. No. 11/847,547, Office Action dated Aug. 6, 2008.
U.S. Appl. No. 11/847,547, Notice of Allowance dated Feb. 9, 2009.
U.S. Appl. No. 12/873,962, Office Action dated Oct. 7, 2011.
U.S. Appl. No. 12/873,962, Office Action dated Apr. 5, 2012.
U.S. Appl. No. 12/873,962, Office Action dated Aug. 24, 2012.
U.S. Appl. No. 12/873,962, Notice of Allowance dated Nov. 30, 2012.
U.S. Appl. No. 12/848,834, Office Action dated Feb. 25, 2011.
U.S. Appl. No. 12/848,834, Notice of Allowance dated Sep. 9, 2011.
U.S. Appl. No. 13/302,310, Notice of Allowance dated Jan. 20, 2012.
U.S. Appl. No. 13/302,310, Corrected Notice of Allowability dated Feb. 14, 2012.
U.S. Appl. No. 11/565,518, Restriction Requirement dated May 8, 2009.
U.S. Appl. No. 11/565,518, Office Action dated Aug. 14, 2009.
U.S. Appl. No. 11/565,518, Notice of Allowance dated Mar. 24, 2010.
PCT Application No. PCT/US2007/084343, International Search Report and Written Opinion dated Mar. 13, 2008.
PCT Application No. PCT/US2007/084343, International Preliminary Report on Patentability dated Jun. 3, 2009.
U.S. Appl. No. 11/365,790, Office Action dated Aug. 27, 2008.
U.S. Appl. No. 11/365,790, Notice of Allowance dated Mar. 30, 2009.
PCT Application No. PCT/US2007/062506, International Search Report and Written Opinion dated Feb. 6, 2008.
PCT Application No. PCT/US2007/062506, International Preliminary Report on Patentability dated Aug. 26, 2008.
CN Application No. 200780010572.6, Office Action dated Oct. 16, 2009 (English translation).
CN Application No. 200780010572.6, Office Action dated Jun. 22, 2010 (English translation).
CN Application No. 200780010572.6, Office Action dated Jan. 10, 2011 (English translation).
CN Application No. 200780010572.6, Office Action dated May 6, 2011 (English translation).
EP Application No. 07 75 7281, European Search Report dated Mar. 9, 2010.
EP Application No. 07 75 7281.6, Office Action dated Dec. 4, 2012.
EP Application No. 07 75 7281.6, Office Action dated Jun. 14, 2013.
JP Application No. 2008-556528, Office Action dated Feb. 19, 2013 (English translation).

(56) References Cited

OTHER PUBLICATIONS

KR Application No. 2008-7023176, Office Action dated Mar. 22, 2013 (English translation).
TW Application No. 96106434, Office Action dated Mar. 7, 2013 (English translation).
U.S. Appl. No. 10/001,092, Office Action dated Apr. 3, 2003.
U.S. Appl. No. 10/001,092, Notice of Allowance dated Sep. 2, 2003.
U.S. Appl. No. 09/855,305, Office Action dated May 30, 2002.
U.S. Appl. No. 09/855,305, Notice of Allowance dated Nov. 1, 2002.

* cited by examiner

AUTOFOCUS CAMERA SYSTEMS AND METHODS

PRIORITY CLAIM

This application is a continuation of application Ser. No. 14/201,702, filed Mar. 7, 2014, which is a continuation of application Ser. No. , filed Dec. 31, 2012, now U.S. Pat. No. 8,682,156 issued Mar. 25, 2014, which is a continuation of application Ser. No. 13/225,257 filed Sep. 2, 2011, now U.S. Pat. No. 8,346,074 issued Jan. 1, 2013, which is a continuation of 12/873,943 filed Sep. 1, 2010, now U.S. Pat. No. 8,014,662 issued Sep. 6, 2011, which is a divisional of application Ser. No. 11/361,608 filed Feb. 24, 2006, now U.S. Pat. No. 7,813,634 issued Oct. 12, 2010, which is a continuation-in-part of both application Ser. No. 11/268,849 filed on Nov. 8, 2005, now U.S. Pat. No. 7,646,969 issued Jan. 12, 2010, and Application Ser. No. 11/269,304 filed Nov. 8, 2005, now U.S. Pat. No. 7,555,210 issued Jun. 30, 2009, both of which claim priority to and benefit of U.S. Provisional Patent Application No. 60/657,261 filed Feb. 28, 2005. The respective disclosures of each of these references is incorporated herein by reference in their entirety.

TECHNICAL FIELD

The present invention relates generally to cameras. The present invention relates more particularly to a miniature autofocus camera that is suitable for use in personal electronic devices, such as cellular telephones.

BACKGROUND

Digital cameras are well known. As their cost drops, digital cameras continue to grow in popularity. Digital cameras eliminate the need to purchase film and have it developed. They also greatly reduce the need to have prints made, since digital images can easily be viewed on a computer monitor or the like. Digital cameras have thus reduced the overall cost of photography.

One rapidly growing application for digital cameras is their use in personal electronic devices, such as cellular telephones. Camera phones outsold other digital cameras for the first time in the last quarter of 2003. Camera phones enable pictures to be conveniently and rapidly shared with others. Images can be captured on the spur of the moment and then easily communicated to others via the cellular telephone network and/or via the Internet.

Although such contemporary camera phones have proven generally suitable for their intended purposes, they possess inherent deficiencies that detract from their overall effectiveness and desirability. For example, contemporary digital cameras commonly have variable focus. However, contemporary camera phones do not have this desirable feature. Contemporary variable focus mechanisms are simply too bulky for today's compact camera phones.

Consequently, contemporary camera phones have fixed focuses. Although a fixed focus can sometimes be adequate under good lighting conditions, a fixed focus generally does not perform well when the camera is used in low light conditions. A fixed focus mechanism approximates a pinhole lens to provide sufficient depth of field so as to remain in focus, at least to some degree, regardless of the distance between the subject and the camera. However, such a stopped-down lens is undesirably sensitive to ambient lighting conditions. This is because the near pinhole lens of a fixed focus camera does not admit much light. Thus, such fixed focus cameras generally require more light than variable focus cameras. In addition, the small aperture of a pinhole lens limits the resolution of the camera, due to the diffraction limit of light. Thus, such fixed focus cameras generally have lower resolution than variable focus cameras.

When there is insufficient ambient lighting, the image tends to appear undesirably dark. In recognizing the limitations of contemporary camera phones using such fixed focus lenses, the prior art has provided flash mechanisms in an attempt to insure that adequate light is provided. However, cellular telephones use battery power supplies, and thus have limited power available for the use of such flash mechanisms. More frequent use of the flash to take photographs thus results in the need to more frequently charge the camera phone. Of course, frequent recharging is undesirable.

As such, it is desirable to provide a miniature autofocus camera that is suitable for use in personal electronic devices, such as cellular telephones.

BRIEF SUMMARY

Systems and methods are disclosed herein to provide a miniature autofocus camera that is suitable for use in personal electronic devices, such as cellular telephones, pocket PCs, notebook computers, laptop computers, and tablet computers. In accordance with an embodiment of the present invention, a stage for a miniature camera is at least partially formed by a MEMS process. The stage can comprise a fixed portion, a movable portion, and flexures for controlling movement of the movable portion with respect to the fixed portion. Thus, for example, a lens can be attached to the movable portion of the MEMS stage and movement of the lens can be substantially limited to movement in one degree of freedom.

In one example embodiment, a method for focusing a miniature camera includes effecting a current flow through a coil, moving a magnet in response to the current flow, moving a MEMS stage in response to the moving of the magnet, moving a lens in response to the moving of the MEMS stage, and limiting movement of the MEMS stage to substantially one degree of freedom.

In another embodiment, a method for making a photograph comprises effecting current flow through a coil, moving a lens in response to the current flow, limiting movement of the lens to substantially one degree of freedom along an optical axis of the lens with a snubber assembly, and focusing an image on an imaging sensor in response to the moving of the lens.

According to another embodiment, a method for operating an electronic device comprises using a controller to control a Lorentz actuator such that a lens which is limited to a single degree of freedom of movement by a snubber assembly focuses an image on an imaging sensor.

According to an embodiment of the present invention, a stage assembly can comprise a stage, at least one magnet of an actuator attached to the stage for effecting movement of the stage, and at least one lens attached to the stage such that movement of the lens effects focusing of the camera. A coil attached to a housing of the camera can cooperate with the magnet to effect such movement.

Thus, according to an embodiment of the present invention, a method for focusing a miniature camera can comprise effecting current flow through a coil such that a magnet moves in response to the current flow. A stage moves in response to movement of the magnet and a lens moves in response to movement of the stage.

According to an embodiment of the present invention, a method for assembling a miniature camera can comprise attaching a magnet assembly, a stage, and a lens mount together in a planar fashion. Such assembly facilitates the use of automated assembly equipment, such as pick and place equipment.

According to an embodiment of the present invention, a miniature camera can comprise a housing and a coil attached to the housing so as to be substantially fixed in position with respect thereto. The housing can be configured so as to align the coil with respect to a magnet attached to a stage. The housing can also be configured so as to align the stage with respect to an imaging sensor.

According to an embodiment of the present invention, a miniature camera can comprise an imaging sensor, a lens mount configured to mount at least one lens, and a cover within which the lens mount is disposed. The cover and the lens mount can be configured so as to limit movement of the lens mount. For example, the cover can be configured so as to abut the lens mount when the lens mount moves to a limit of travel away from the imaging sensor.

The cover can be formed of metal and configured so as to mitigate electromagnetic interference with the camera. Thus, performance of the camera can be substantially enhanced.

According to an embodiment of the present invention, a miniature camera can comprise an imaging sensor, an optics assembly having at least one movable optical element wherein movement of the optical element(s) effect focusing of the camera, a MEMS stage to which the movable optical element(s) are attached such that the stage controls motion of the movable optical element(s), and an actuator for moving the stage.

According to an embodiment of the present invention, a miniature camera can comprise an imaging sensor, a housing, and a MEMS stage disposed within the housing, wherein the MEMS stage is configured so as to move substantially in only one degree of freedom. A snubber assembly can be configured to further limit movement of the MEMS stage in substantially five degrees of freedom, so as to protect the stage from excessive movement. A lens holder can be attached to one surface, e.g., the upper surface, of the stage. At least one focusing lens can be attached to the lens holder.

An actuator can be disposed within the housing. The actuator can comprise a coil attached to the housing and a magnet attached to the stage. The housing can align the coil with respect to the magnet and can also align the stage with respect to the imaging sensor. A bias spring can be configured to bias the stage into a predefined position with respect to the housing. The metal cover can be configured to substantially enclose the actuator and the imaging sensor. The actuator can effect movement of the lens so as to provide desired focusing of an image upon the imaging sensor.

According to an embodiment of the present invention, a method for making a miniature camera can comprise providing a printed circuit board, attaching an imaging sensor to the printed circuit board, providing a MEMS stage that is configured to move in substantially only one degree of freedom, attaching a lens mount to the MEMS stage in a planar fashion, attaching a lens to the lens mount, attaching a magnet to the MEMS stage in a planar fashion, providing a housing, attaching a coil to the housing, placing the MEMS stage and a snubber assembly within the housing, wherein the snubber assembly is configured to limit movement of the MEMS stage in substantially five degrees of freedom, compressing a bias spring so as to bias the stage into a predefined position with respect to the housing and attaching a clip to the housing so as to hold the bias spring in place, and at least partially enclosing the actuator and the imaging sensor with a metal cover.

In view of the foregoing, a miniature autofocus camera is provided. The miniature autofocus camera is suitable for use in personal electronic devices, such as cellular telephones. The autofocus miniature camera can provide enhanced images in low light conditions. The need for a flash is mitigated, such that battery life is extended.

This invention will be more fully understood in conjunction with the following detailed description taken together with the following drawings.

BRIEF DESCRIPTION OF THE DRAWINGS

14 attached thereto, wherein the lens assembly is removed to show the imaging sensor attached to the printed circuit board.

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
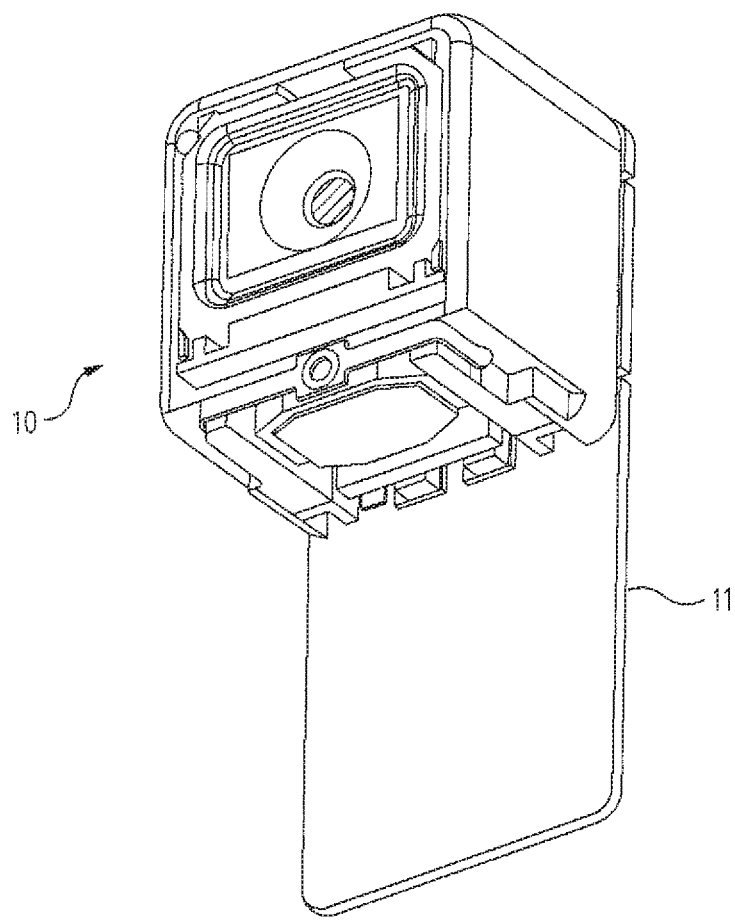
FIG. 1 is a perspective view of an autofocus camera according to an exemplary embodiment of the present invention, wherein an electromagnetic interference (EMI) shield of the camera has been omitted to better show components thereof.

When an optical system is reduced in size, the precision required for the placement of optical elements has to be improved in proportion to the reduction in size. In other words, optical systems can scale in size linearly. For cameras in cellular telephones, the reduction in the size of the imaging system can be dramatic. It is thus a challenge to be able to position and move the optical elements with respect to each other with the required precision.

To be able to accomplish autofocus in a cellular telephone camera, it is common to move a lens or group of lenses. The position and motion of these lenses has to be very precise. Achieving such precision using contemporary technologies is difficult.

One or more embodiments of the present invention provide enhanced precision in the motion of very small camera components by using a micro electromechanical systems (MEMS) stage. This MEMS stage provides for very precise control in the motion of a lens and accomplishes this in a suitably compact form. The MEMS stage serves as an optical bench for precision alignment of the lens with respect to an imaging sensor. According to an embodiment of the present invention, the MEMS stage moves substantially within a plane. That is, the stage tends to remain within the plane defined by the stage itself, rather than moving substantially orthogonally to this plane.

The MEMS stage can be moved by using an electromagnetic actuator. A magnet assembly part of the actuator can be attached to one side, e.g., the bottom, of the stage. A coil of the actuator can be attached to a housing of the camera. The coil and the magnet assembly are aligned to each other via the MEMS stage and the housing. A lens mount that holds the optical element can be attached to the other side, i.e., the top, of the stage. To control the alignment, e.g., tilt, of the lens(es) with respect to an imaging sensor, a number of features are introduced so as to passively align optical components with respect to each other.

Thus, a method and system for providing an autofocus camera arc disclosed herein. According to one embodiment of the present invention, the autofocus camera is a miniature camera that is suitable for use in personal electronic devices, such as cellular telephones, pocket PCs, notebook computers, laptop computers, and tablet computers. At least one embodiment of the autofocus camera of the present invention is also suitable for use as a stand alone device. Such a stand alone device can be used for security and surveillance applications, as well as any other desired applications.

The MEMS stage can be used to control the motion of a lens so that the lens moves substantially in only one degree of freedom. The magnet assembly and the lens mount can be attached to the MEMS stage in a planar fashion, so as to better facilitate the use of automated assembly equipment. The housing CM be configured so as to both hold the coil of an actuator and align the coil with respect to a magnet assembly. The housing can also be configured so as to align the MEMS stage (and therefore the lens) with respect to the imaging sensor.

Attaching one component to another in a planar fashion as referred to herein can mean placing one component atop another component. Thus, assembling components in a planar fashion can be stacking of the components.

A bias spring can be used to position the stage such that the lens is positioned for focus at one extreme of its travel, e.g., at infinity, when no power is applied to the actuator. Bias spring can be formed of a non-magnetic material so as not to interfere with operation of the actuator. A simple metal clip can be used to hold the bias spring in position against the magnet assembly (which can be attached to the stage).

A metal cover can be used both for electromagnetic interference (EMI) protection and for limiting the motion of the lens mount. The lens mount can have a visor like structure that is configured to abut the metal cover when the stage (and consequently the lens mount) moves too far one direction, e.g., away from the imaging sensor. The visor like structure can be configured so as to abut against the housing when the stage (and consequently the lens mount) moves too far in the other direction, e.g., toward the imaging sensor.

The MEMS stage motion can be limited in all degrees of freedom by snubbers so as to protect the flexures from over extending and/or over compressing, such as during a shock. In the travel direction (a direction along an optical axis of the camera in which one or more lenses move to effect focusing), the lens mount can abut axial snubbers to limit the motion. In all other degrees of freedom, the silicon stage abuts with six degree of freedom snubbers if the stage's normal limits of motion are exceeded.

These, as well as other features and aspects of various exemplary embodiments of the present invention are discussed below in further detail with respect to the drawings.

Figure 2:
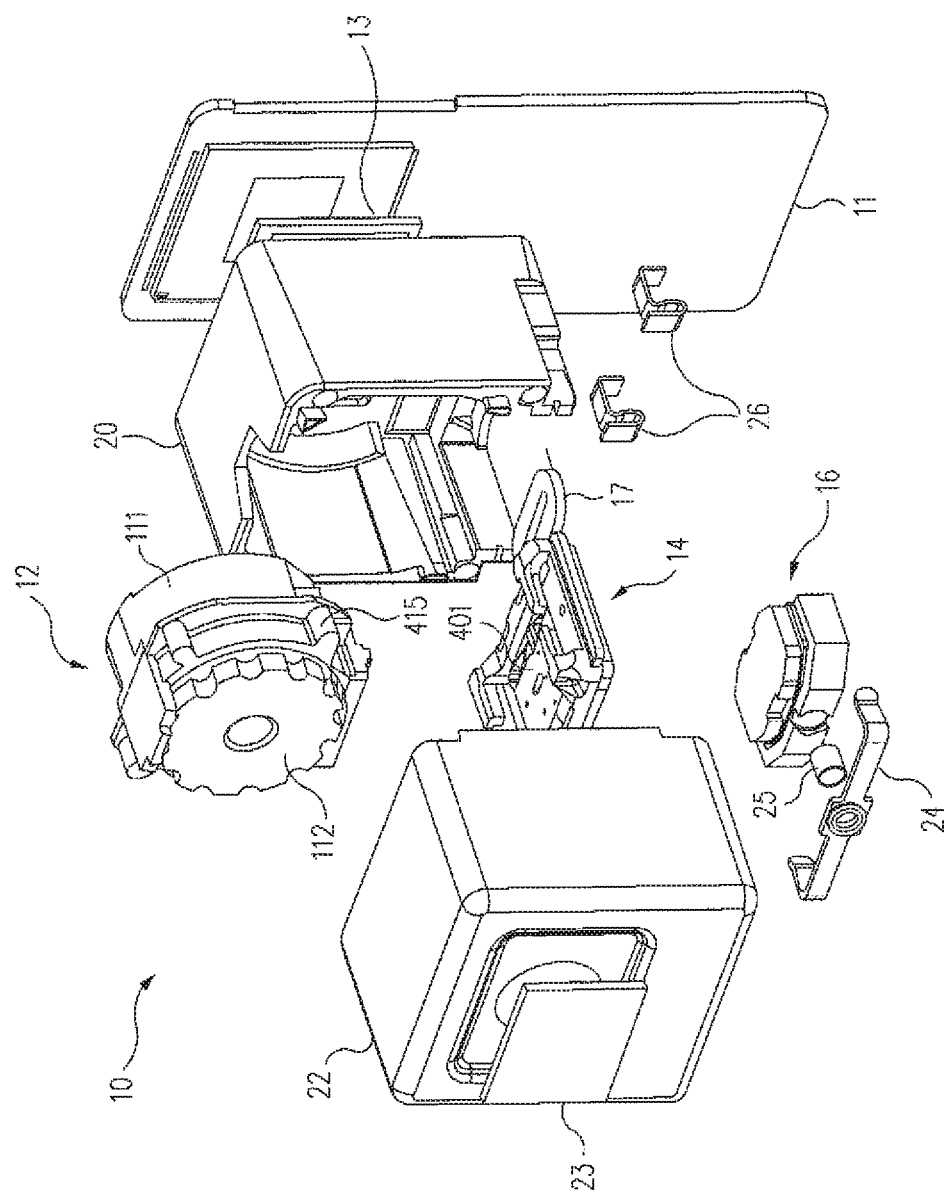
FIG. 2 is an exploded view of the autofocus camera of FIG. 1, including the electromagnetic interference shield thereof.

Referring now to FIGS. 1 and 2, according to one embodiment of the present invention, a miniature autofocus camera can comprise a camera assembly 10 mounted upon a printed circuit board (PCB) 11. Camera assembly 10 can comprise camera optics 12. Camera optics 12 can have at least one movable optical element, such as a lens, so as to facilitate focusing of an image upon an imaging sensor 13.

Imaging sensor 13 can be mounted to printed circuit board 11. Alternatively, imaging sensor 13 can be attached to camera assembly 10. Attachment of imaging sensor 13 to printed circuit board 11 facilitates communication of electrical signals between imaging sensor 13 and other electrical components such as a monitor, memory, and/or a processor. For example, such electrical communication can be facilitated by conductive traces formed upon printed circuit board 11.

As discussed in further detail below, camera optics 12 can be attached to a stage assembly 14 that controls movement of camera optics 12. Movement of camera optics 12 is controlled in a manner that facilitates focusing of the miniature camera while also mitigating misalignment of the optical elements of the miniature camera. Thus, linear movement of camera optics 12 along an optical axis of the camera, e.g., toward and away from imaging sensor 13, is facilitated while movement perpendicular to the optical axis and all rotation of camera optics 12 is inhibited.

More particularly, a stage 401 (better shown in FIGS. 4 and 5) is configured so as to facilitate movement along the direction of the optical axis while not readily facilitating other movement. A six degree of freedom snubber 402 cooperates with axial snubbers 403 to limit movement of stage 401 beyond that for which it is configured. Construction and operation of stage 401, six degree of freedom snubbers 402, and axial snubbers is discussed in further detail below.

A magnet assembly 16 and coil 17 cooperate to define an actuator that effects movement of a stage 401 (and consequently camera optics 12) along the optical axis of the miniature camera to facilitate focusing. The actuator can be a Lorentz actuator. Alternatively, the actuator can be any other desired type of actuator. Advantages associated with the use of the particular Lorentz actuator disclosed herein include small size, reduced weight, low profile, and strong forces generated thereby. Such an actuator is discussed in further detail in commonly owned application Ser. No. 11/263,149, filed on Oct. 31, 2005, and entitled LORENTZ ACTUATOR FOR MINIATURE CAMERA, the disclosure of which is incorporated herein by reference.

Magnet assembly 16 can be attached to the underside of stage assembly 14 and coil 17 can be attached to housing 20. Housing 20 generally encloses camera optics 12, stage assembly 14, magnet assembly 16, and coil 17. Housing 20 also facilitates attachment of camera assembly 10 to printed circuit board 11, such as via the use of adhesive bonding. Housing 20 can alternatively be attached to printed circuit board 11 via the use of detents, fasteners, ultrasonic welding, soldering, or via any other desired method.

An electromagnetic interference shield 22 can optionally cover a substantial portion of the miniature autofocus camera of the present invention so as to mitigate the undesirable effects of electromagnetic interference thereupon. As those skilled in the art will appreciate, as miniature cameras get smaller, the effects of electromagnetic interference tend to become more pronounced. As miniature cameras get smaller, the amount of current and voltage used in control and image signals tends to be reduced. The use of lower signal levels potentially makes these signals more susceptible to interference, such as that caused by electromagnetic radiation emitted by nearby electronic devices, as well as possibly by the personal electronic device within which the miniature camera is installed itself.

A transparent window 23 can be attached to electromagnetic interference shield 22. Electromagnetic interference shield 22 and window 23 can cooperate to inhibit environment contaminants, such as dust, moisture, and smoke, from undesirably contacting optical elements of the miniature camera, such as the lens(es) of camera optics 12 and such as imaging sensor 13. Electromagnetic interference shield 22 can also define a stop that at least partially defines one or more limits on the motion of camera optics 12, as discussed below.

Clip 24 holds bias spring 25 in place. Bias spring 25 biases stage assembly 14 in one direction of its travel, e.g., at a position for focus at infinity. Such biasing provides a known starting position of stage assembly 14 to better facilitate control of movement thereof and provides a desirable fail safe (focus at infinity) therefore. Such a bias spring is discussed in further detail in application Ser. No. 11/219,259, filed Sep. 2, 2005, and entitled MINIATURE CAMERA BIAS SPRING, the disclosure of which is incorporated herein by reference.

Contacts 26 facilitate electrical communication between coil 17 and printed circuit board 11. Each of two leads of coil 17 can be in electrical communication with a dedicated contact 26. Each contact 26 can contact a conductive pad of printed circuit board 11. However, those skilled in the art will appreciate that other means for facilitating electrical communication between coil 17 and printed circuit board 11 are likewise suitable.

Figure 3:
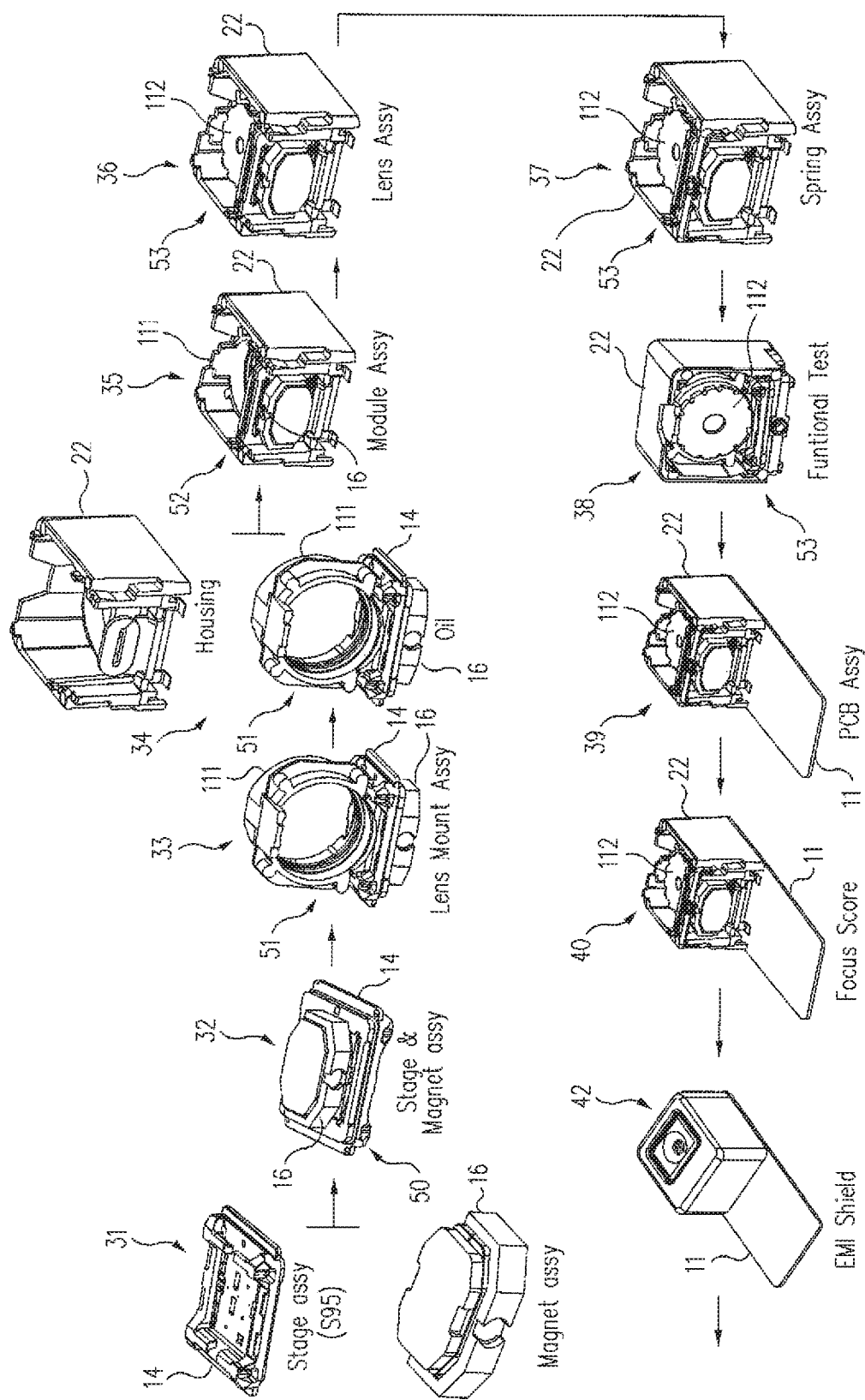
FIG. 3 is a pictorial flow chart showing assembly of the autofocus camera of FIG. 1, according to an exemplary embodiment of the present invention.

Referring now to FIG. 3, a flow chart showing assembly of the autofocus camera of FIG. 1 according to an exemplary embodiment of the present invention is provided. Steps 31-42 are some key aspects of the assembly of the autofocus camera.

According to an embodiment of the present invention, the autofocus camera can be assembled by providing stage assembly 14 and magnet assembly 16 as shown in step 31 and attaching them together, such as via adhesive bonding, to form stage and magnet assembly 50 as shown in step 32. Lens mount 111 can then be attached, such as via adhesive bonding, to the stage and magnet assembly 50 to provide the lens mount assembly 51 shown in step 33.

Lens mount 111, stage assembly 14, and magnet assembly 16 can be assembled to one another in a planar fashion. That is, lens mount 111, stage assembly 14, and magnet assembly 16 can be assembled to one another by successively placing one item atop another. Such assembly facilitates the use of automated assembly equipment such as robots or pick and place equipment. For example, such automated assembly equipment can apply adhesive to magnet assembly 16, place stage assembly 14 upon magnet assembly 16, apply adhesive to stage assembly 14, and place lens mount 111 upon stage assembly 14.

Housing 22 and lens mount assembly 51 of step 34 can be assembled together by inserting lens mount assembly 51 into housing 22 to provide module assembly 52 of step 35. Insertion of lens mount assembly 51 into housing 22 can be performed using automated assembly equipment.

Optionally, oil can be applied to stage assembly 14 to provide damping. The application of oil to stage assembly 14 can be performed prior to insertion of lens mount assembly 51 into housing 22. The oil can be applied between stage 401 (FIG. 5) and six degree of freedom snubber 402. Such damping can enhance operation of the autofocus camera by smoothing the movement of the stage 401. Such damping can also provide enhanced protection against vibration and shock. Such oil damping is discussed in further detail in application Ser. No. 11/219,137, filed Sep. 1, 2005 and entitled OIL DAMPING FOR CAMERA OPTICAL ASSEMBLY, the disclosure of which is incorporated herein by reference. In other embodiments, oil may not be added to the MEMS stage.

Lens holder 112 can be attached to lens mount 111 of module assembly 52 to provide lens assembly 53 of step 36. Then, bias spring 25 and clip 24 can be attached to lens assembly 53 as shown in steps 37 and 38.

Functional testing can be performed in step 38 to assure proper operation of the miniature autofocus camera. Functional testing can be performed using test equipment that effects functioning of the autofocus mechanisms such as the actuator defined by magnet assembly 16 and coil 17. Such functional testing can verify proper operation of stage assembly 14, such as the motion control aspects thereof.

Lens assembly 53 can be attached to a printed circuit board 11 at step 39. The focus can be tested to provide a focus score at step 40. Focus testing can be performed using modulation transfer function (MTF). Those units that do not achieve a focus score above a predetermined value can be re-worked and/or rejected. Electromagnetic interference shield 11 can be added at step 42 and then additional testing can be done.

Some aspects of the assembly steps shown in FIG. 3 are discussed in further detail below. Those skilled in the art will appreciate that other sequences of operations can be used to assemble the autofocus camera of one or more embodiments of the present invention.

Figure 4:
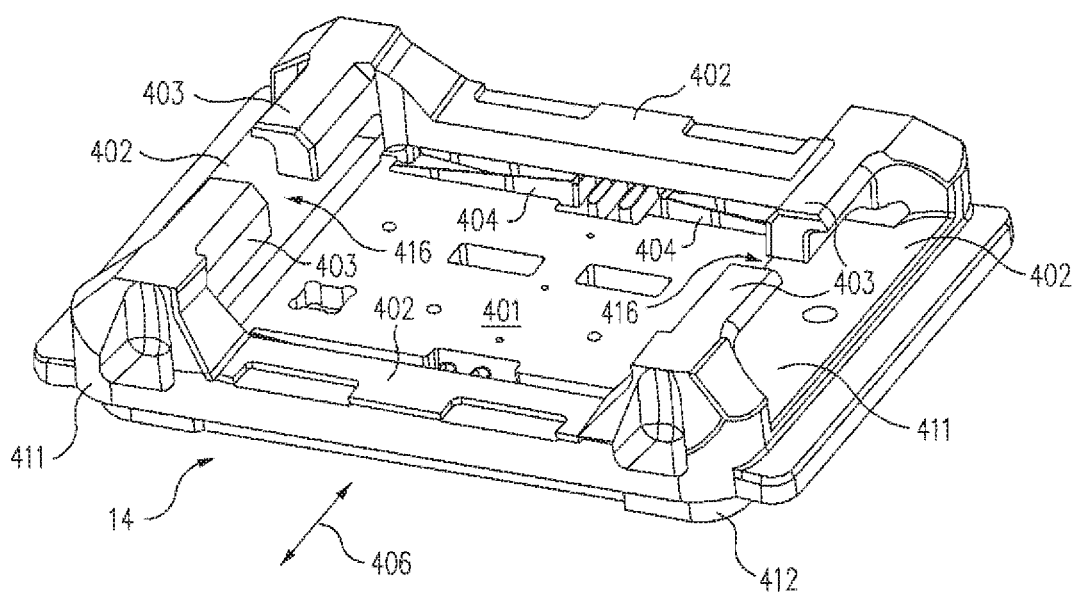
FIG. 4 is an enlarged perspective view of the stage and snubber assembly of FIG. 2.
Figure 5:
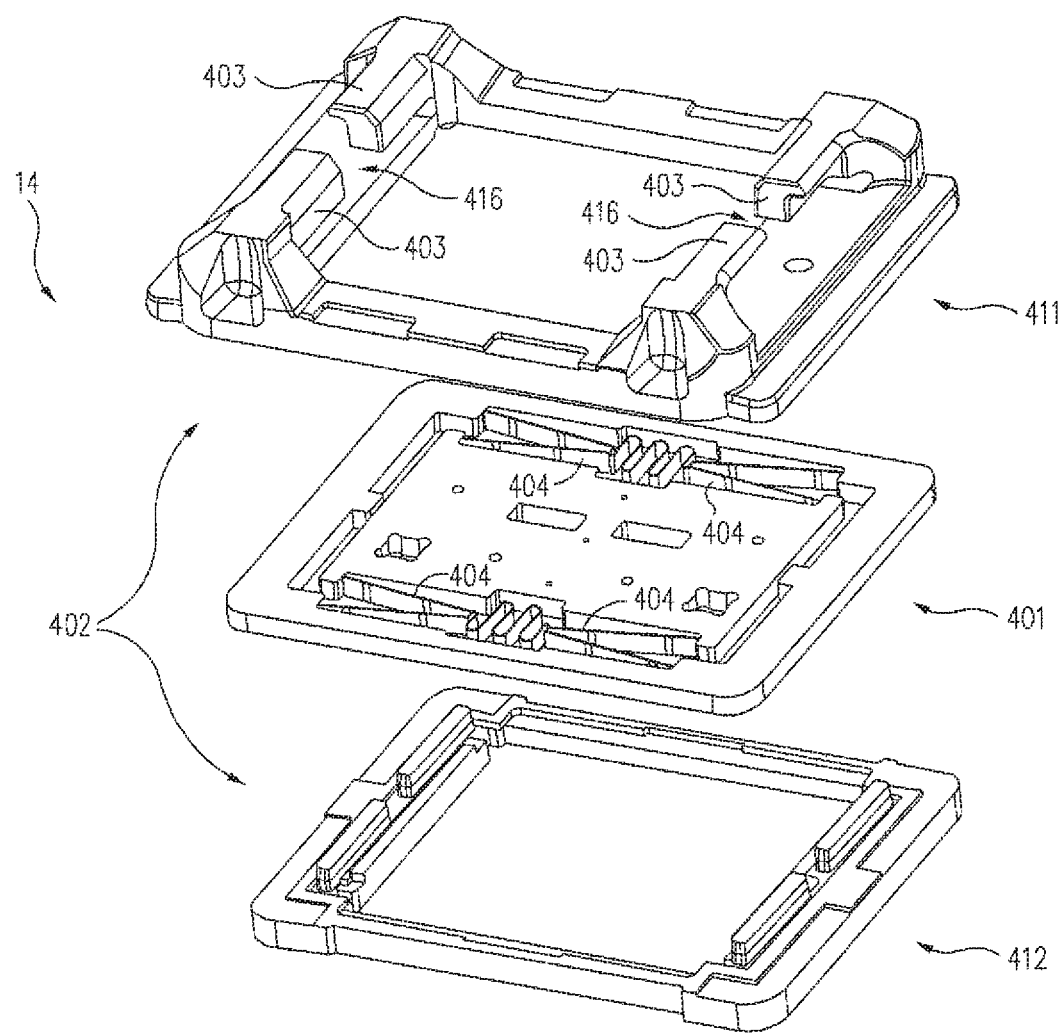
FIG. 5 is an exploded perspective view of the stage and snubber assembly of FIG. 4.

Referring now to FIGS. 4 and 5, a stage assembly 14 comprises a stage 401, a six degree of freedom snubber 402 within which stage 401 is captured, and axial snubbers 403. Six degree of freedom snubber 402 can comprise an upper portion 411 and a lower portion 412 that cooperate to sandwich stage 401 therebetween. Six degree of freedom snubber 402 can be formed of a rigid polymer material.

Axial snubbers 403 can be formed integrally with upper portion 411 of six degree of freedom snubber 402. Alternatively, axial snubbers 403 can be formed separately from upper portion 411 of six degree of freedom snubber 402 and then attached thereto.

Stage 401, in cooperation with six degree of freedom snubber 402 and axial snubbers 403, defines the motion of camera optics 12. That is, stage 401 and six degree of freedom snubber 402 enable substantial movement of camera optics 12 along an optical axis of the autofocus camera, e.g., in the directions of double-headed arrow 406, while limiting both translation and rotation about all other axes. A width of stage 401 can be defined as being the shortest of the two longer dimensions thereof, such as the dimension in the direction of arrow 406. A length of stage 401 can be defined as being the longest of the two longer dimensions thereof, such as the dimension perpendicular to the direction of arrow 406. A height of stage 401 can be defined as being the shortest dimension of stage 401 (i.e., from a top or upper surface thereof to a bottom or lower surface thereof as shown in FIG. 4).

Flexures 404 extend from a stationary portion of stage 401 to a moving portion thereof. Flexures 404 facilitate movement of stage 401 along the optical axis while tending to inhibit other movement thereof. Further disclosure regarding such flexures is provided in U.S. Pat. No. 6,850,675, issued Feb. 1, 2005, and entitled BASE, PAYLOAD AND CONNECTING STRUCTURE AND METHODS OF MAKING THE SAME; application Ser. No. 11/041,122, filed Jan. 21, 2005, now U.S. Pat. No. 7,266,272, issued Sep. 4, 2007, and entitled MOTION CONTROL STAGES AND METHODS OF MAKING THE SAME; and application Ser. No. 11/037,883, filed Jan. 18, 2005, now U.S. Pat. No. 7,113,688, issued Sep. 26, 2006, and entitled BASE, PAYLOAD AND CONNECTING STRUCTURE AND METHODS OF MAKING THE SAME. The respective disclosures of each of these patents is incorporated herein by reference.

Six degree of freedom snubber 402 prevents stage 401 from moving substantially beyond the range of motion permitted by flexures 404. In this manner, six degree of freedom snubber mitigates the likelihood of incurring damage to flexures 404, stage 401, and/or other camera components due to excessive motion of stage 401, such as due to excessive translation and/or rotation thereof. Such a six degree of freedom snubber is discussed in further detail in application Ser. No. 11/268,849, filed Nov. 8, 2005, now U.S. Pat. No. 7,646,969, issued Jan. 12, 2010, and entitled CAMERA SNUBBER ASSEMBLY, the disclosure of which is incorporated herein by reference.

Figure 11:
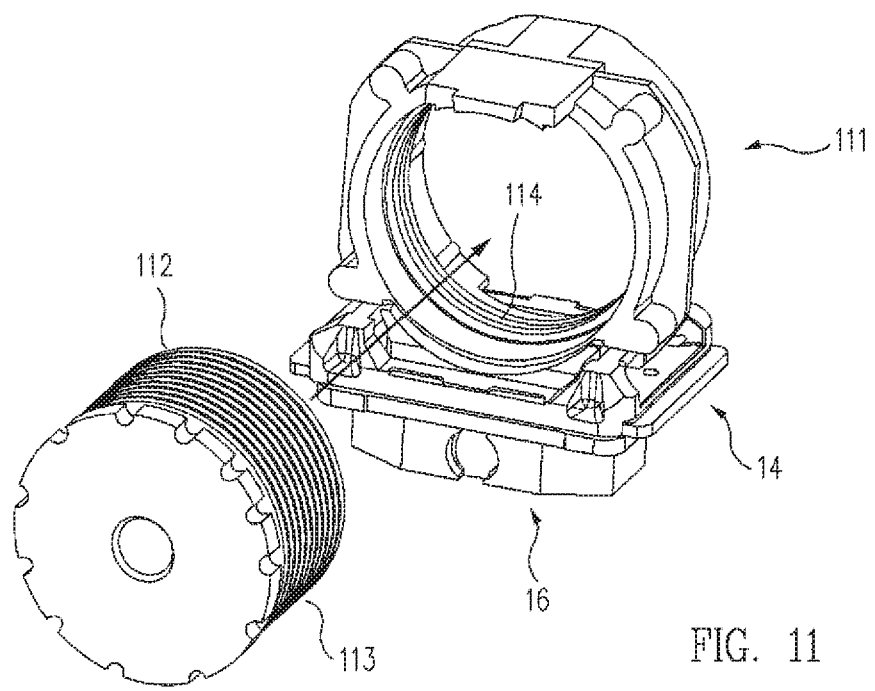
FIG. 11 is a perspective view of the magnet assembly of FIG. 8 attached to the bottom of the stage and snubber assembly of FIG. 4 and the lens mount of FIG. 2 attached to the top thereof.

Axial snubbers 403 limit movement of camera optics 12 (FIG. 2) along the direction of double-headed arrow 406. Axial snubbers 403 thus also limit movement of stage 401 within six degree of freedom snubber 402. Axial snubbers 403 limit movement of lens mount 111 (and consequently of lens holder 112, stage 401, and magnet assembly 16 as well) by abutting stop 415 of lens mount 111 that is disposed in gap defined by adjacent axial snubber 403, as best seen in FIG. 11. Thus, as lens mount 111 moves along the optical axis defined by double-headed arrow 406, stops 415 contacts axial snubber 403 when it travels to each extreme of its movement.

Axial snubbers can be formed of a polymer material, such as silicon rubber, to cushion such contact. It should be noted that the camera can be configured such that contact of stops 415 with axial snubbers does not occur during normal operation. Such limiting of the movement of camera optics 12 and stage 401 can mitigate the likelihood of damage to camera optics 12, stage 401, flexures 404, six degree of freedom snubber 402, and other miniature camera components during abnormal events, such as shock. Such axial snubbers 403 are discussed in further detail in application Ser. No. 11/269,304, filed Nov. 8, 2005, now U.S. Pat. No. 7,555,210, issued Jun. 30, 2009, and entitled AXIAL SNUBBERS FOR CAMERA, the disclosure of which is incorporated herein by reference.

Stage 401 can be formed of silicon using micro electromechanical systems (MEMS) techniques. For example, stage 401 can be formed by etching or micromachining silicon. The fixed portion of stage 401, the moving portion of stage 401, and flexures 404 can be formed from a single, monolithic piece of material, such as silicon. Micromachining can include ion milling, laser ablation, chemical mechanical polishing (CMP), micro-electrical discharge, micro forging, etc.

Stage 401 also provides a way to connect the actuator defined by magnet assembly 16 and coil 17 to optics assembly 12, so as to effect movement of optics assembly 12 in order to facilitate focusing of the miniature camera. More particularly, stage 401 facilitates attachment of magnet assembly 16 to camera optics 12 such that movement of magnet assembly 16 in response to current flow through coil 17 results in like movement of camera optics 12.

Figure 6:
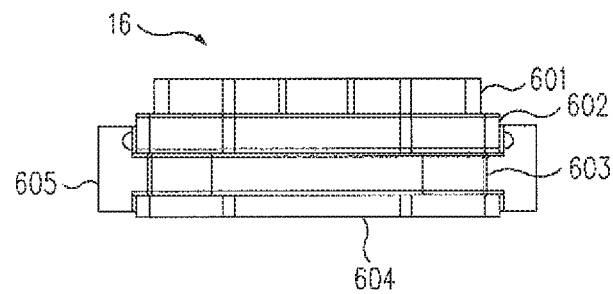
FIG. 6 is an enlarged side view of the magnet assembly of FIG. 2.
Figure 7:
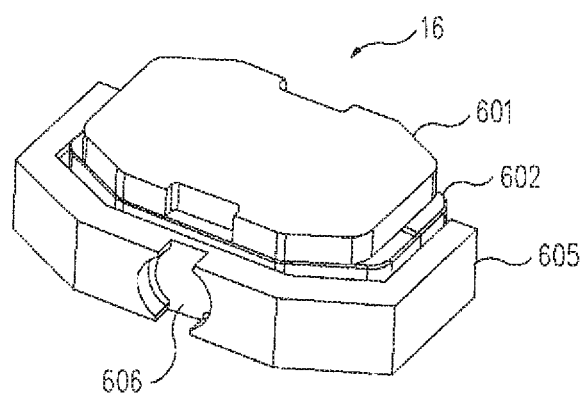
FIG. 7 is a perspective top view of the magnet assembly of FIG. 6.
Figure 8:
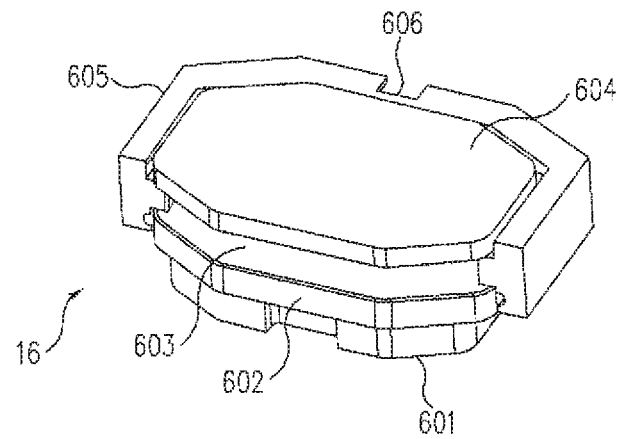
FIG. 8 is a perspective bottom view of the magnet assembly of FIG. 6.

Referring now to FIGS. 6-8, according to an exemplary embodiment of the present invention, a magnet assembly 16 comprises a first magnet 601, a first flux guide 602, a second magnet 603, and a second flux guide 604 assembled together into a stack. A non-magnetic, e.g., plastic, holder 605, helps to maintain the desired positions of magnets 601 and 603 and flux guides 602 and 602. Magnets 601 and 603, flux guides 602 and 604, and holder 605 can be adhesively bonded to one another. Alternatively, magnets 601 and 603, flux guides 602 and 604, and holder 605 can be attached to one another via the use of detents, fasteners, or by any other desired method.

A seat 606 can be formed in holder 605 to receive one end of spring 25. As discussed above, spring 25 biases magnet assembly 16, and thus camera optics 12 as well, to one extreme of travel.

Figure 9:
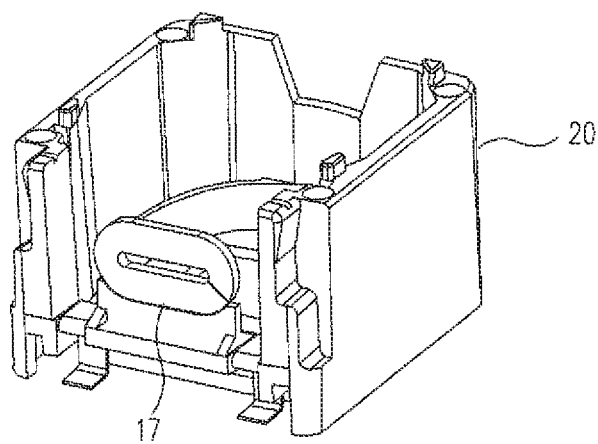
FIG. 9 is a perspective view of the housing of FIG. 2, including the actuator coil.

Referring now to FIG. 9, coil 17 can be attached to housing 20 by adhesive bonding. Coil 17 can alternatively be attached to housing 20 by detents, fasteners, or by any other desired method. Coil 20 is thus fixedly attached to housing 20 and remains substantially stationary with respect thereto during operation of the actuator so as to effect movement of camera optics 12 in order to provide focusing.

Figure 10:
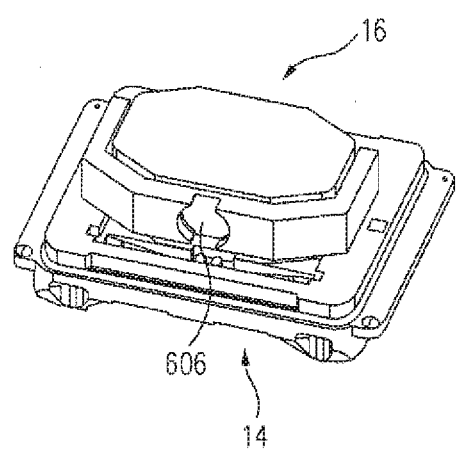
FIG. 10 is a is a perspective view of the magnet assembly of FIG. 8 attached to the bottom of the stage and snubber assembly of FIG. 4.

Referring now to FIG. 10, magnet assembly 16 is attached to the underside of stage assembly 14. More particularly, magnet assembly 16 is attached to the underside of stage 401. Magnet assembly 16 can be attached to stage 401 by adhesive bonding. Alternatively, magnet assembly 16 can be attached to stage 401 by detents, fasteners, or by any other desired method.

Thus, magnet assembly 16 is fixedly attached to stage 401 such that movement of magnet assembly 16 effects similar movement of stage 401. In this manner, camera optics 12, which are attached to stage 401, are also moved so as to effect focusing.

Referring now to FIG. 11, lens holder 112 can be screwed into lens mount 111 to form camera optics 12 via threads 113 formed upon lens holder 112 and threads 114 formed within lens mount 111. The use of threads to attach lens holder 112 to lens mount 111 facilitates adjustment of the optical elements, e.g., lenses, of lens holder 112 with respect to lens mount 111, so as to tend to position such optical elements for optimum operation, e.g., focus is optimal at infinity. However, lens holder 112 can be attached to lens mount 111 by detents, fasteners, adhesive bonding, or by any other desired method. Lens holder 112 can be attached to lens mount 111 either before or after lens mount 111, stage assembly 14, and magnet assembly 16 are inserted into housing 20 (as shown in FIG. 12).

As shown in FIG. 11, lens mount 111 is attached to the upper surface of stage 401 and magnet assembly 16 is attached to the underside or lower surface thereof. Thus, movement of magnet assembly 11 results in like movement of the optical elements of lens holder 112 so as to effect focusing.

Figure 12:
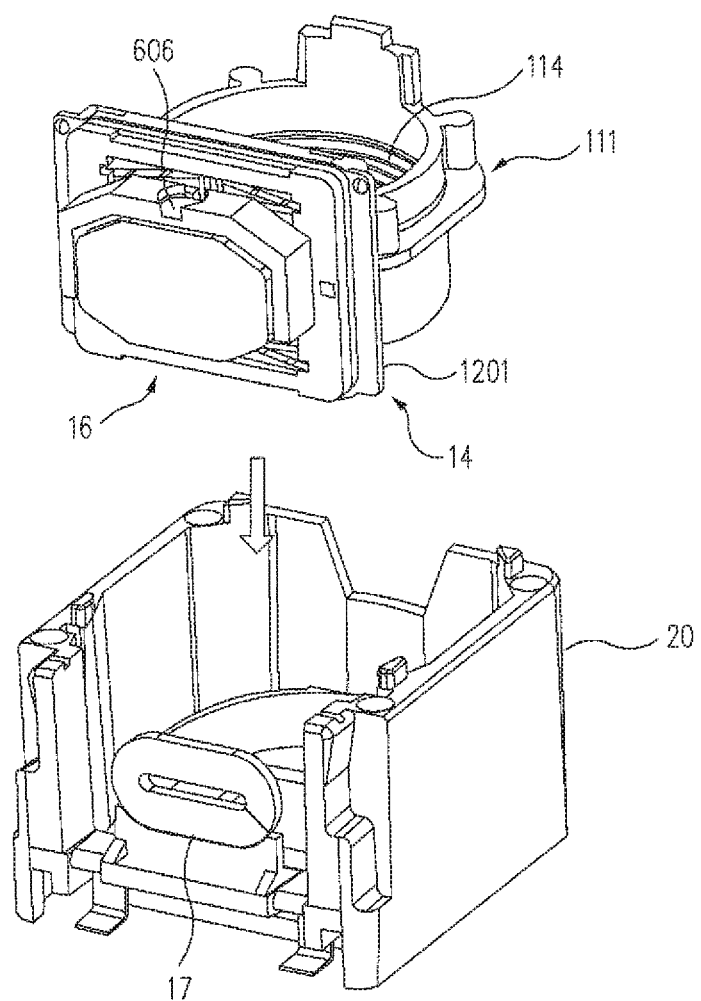
FIG. 12 is a perspective view of the lens mount, magnet assembly, and the stage and snubber assembly (attached to one another) as they are being inserted into the housing of FIG. 2.

Referring now to FIG. 12, lens mount 111, stage assembly 14, and magnet assembly 16 can be inserted into housing 20. Housing 20 can be configured such that a portion of stage assembly 20, such as stationary portion 1201 thereof, attaches to housing 20. Stationary portion 1201 can be attached to housing 20 by adhesive bonding. Alternatively, any other non-moving portion of stage assembly 14 can be attached to housing 20 via detents, fasteners, or by any other desired method. Since a non-moving portion of stage assembly 14 is attached to housing 20, stage 401, magnet assembly 16, and lens mount 111 (which contains lens holder 112) are free to move along an optical axis of the miniature camera (as indicated by double-headed arrow 406 of FIG. 4).

Figure 13:
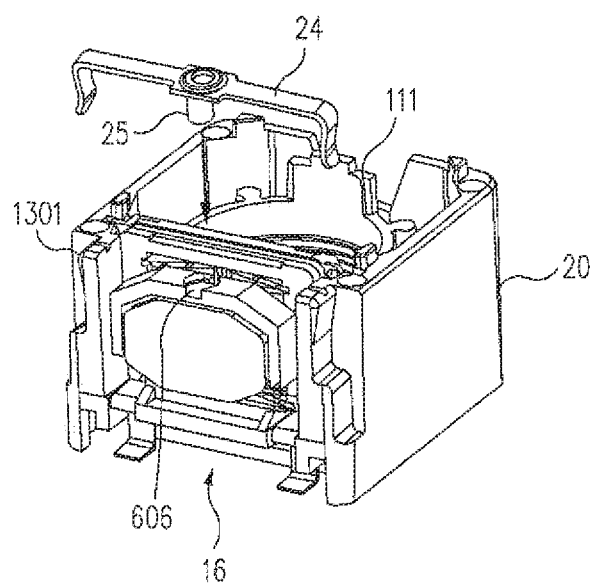
FIG. 13 is a perspective view of the lens mount, magnet assembly, and the stage and snubber assembly after they have been inserted into the housing of FIG. 2, and showing the clip of FIG. 2 as it is being attached to the housing so as to maintain the bias spring therein.
Figure 14:
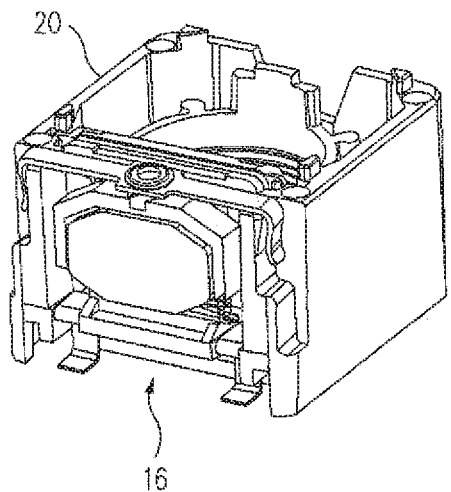
FIG. 14 is a perspective view of the lens mount, magnet assembly, and the stage and snubber assembly after they have been inserted into the housing of FIG. 13, and showing the clip after it has been attached to the housing.

Referring now to FIGS. 13 and 14, clip 24 can be attached to housing 20 to hold bias spring 25 against seat 606 of magnet assembly 16. Clip 24 can snap over detents 1301 of housing 20 to effect such attachment. Alternatively, clip 24 can be attached to housing 20 via adhesive bonding, fasteners, or by any other desired method.

Figure 15:
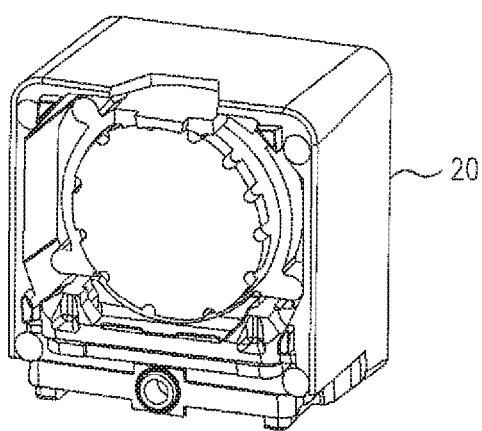
FIG. 15 is a perspective view of the partially assembled autofocus camera of FIG. 14 after the lens assembly of FIG. 2 has been screwed into the lens mount thereof.

Referring now to FIG. 15, lens holder 112 can be attached to lens mount 111 after lens mount 111 (along with stage assembly 14 and magnet assembly 16) have been placed into housing 20, if desired. Alternatively, lens holder 112 can be attached to lens mount 11 before lens mount 11 has been placed into housing 20.

Figure 16:
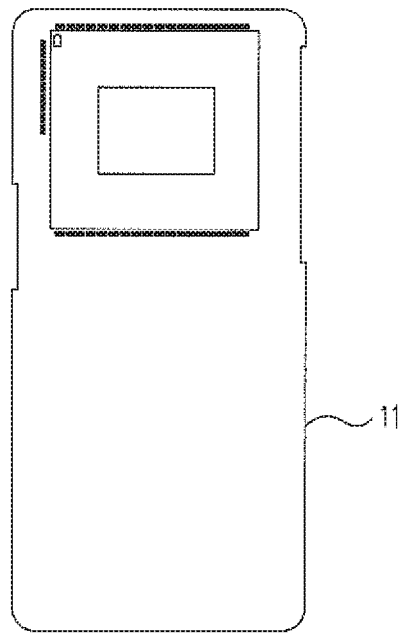
FIG. 16 is an enlarged front view of the printed circuit board of FIG. 2.

Referring now to FIG. 16, printed circuit board 11 is configured to facilitate attachment of imaging sensor 13 (FIG. 2) and housing 20 thereto. Printed circuit board 11 can also be configured for the attachment of camera electronics thereto. Such camera electronics can include a processor and/or controller that facilitates, possibly among other things, control of the autofocus actuator defined by coil 17 and magnet assembly 16, as well as facilitates control and readout of imaging sensor 13.

Figure 17:
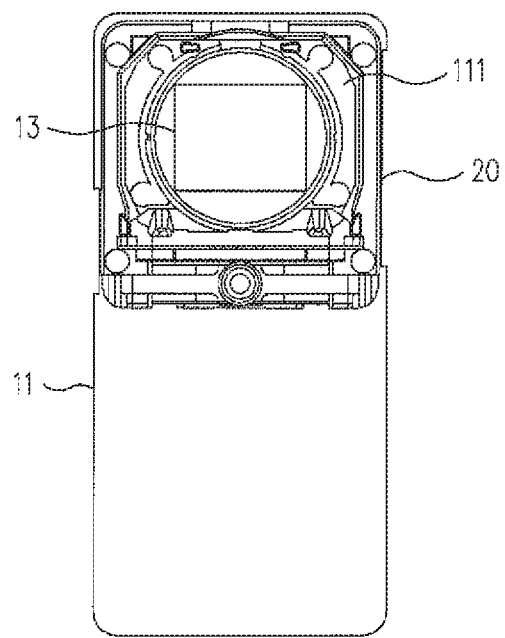
FIG. 17 is a front view of the printed circuit board of FIG. 16 having the partially assembled autofocus camera of FIG.

Referring now to FIG. 17, housing 20 is shown attached to printed circuit board 20. Imaging sensor 13 is also attached to printed circuit board 11. Lens holder 112 is shown removed from lens mount 111, so that imaging sensor 13 can be seen.

Figure 18:
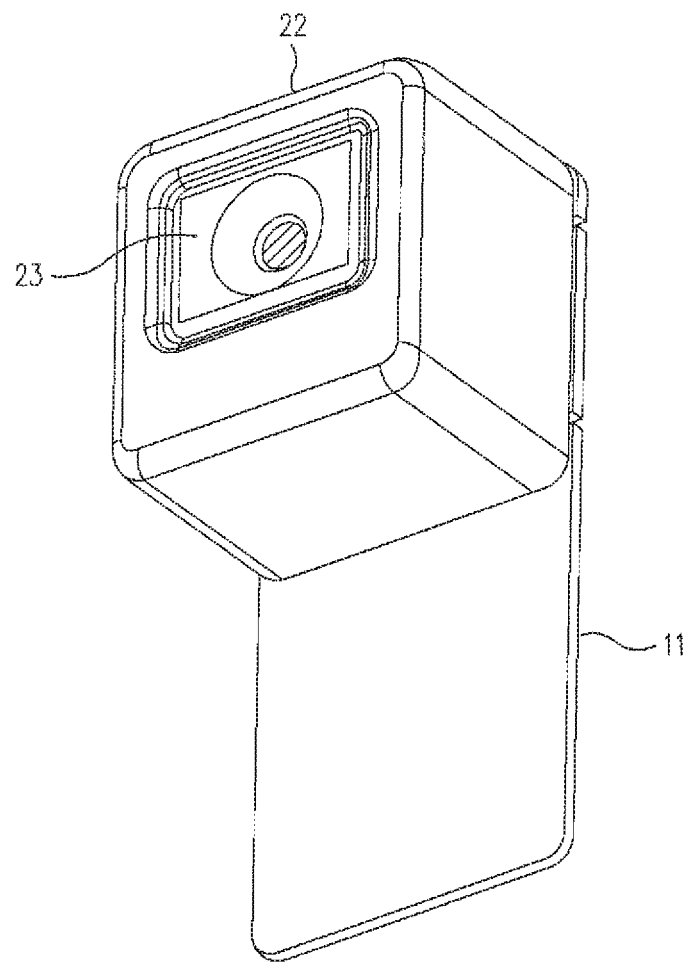
FIG. 18 is a perspective view of the assembled autofocus camera of FIG. 2.

Referring now to FIG. 18, electromagnetic interference shield 22 is shown covering housing 20. Electromagnetic interference shield 22 can be attached to housing 20 and/or printed circuit board 11 by adhesive bonding. Alternatively, electromagnetic interference shield 22 can be removably attached to housing 20 and/or printed circuit board 11 via detents, fasteners, or any other desired method.

In operation, current flows through coil 17 such that a Lorentz force generated by the cooperation of coil 17 with magnet assembly 16 causes stage 401 to move. Current flow through coil 17 can be controlled by a processor, such as a dedicated processor mounted on printed circuit board 11, to provide autofocus. The processor can alternatively be a processor of a personal electronic device, such as a processor of a cellular telephone. Stage 401 can be moved so as to position camera optics 12 in a manner that effects autofocus according to well known principles. Alternatively, movement of stage 401 can be controlled manually, such as via a switch of the personal electronics device, so as to enable a user to focus the camera.

In view of the foregoing, one or more embodiments of the present invention provide miniature autofocus camera that is suitable for use in personal electronic devices, such as cellular telephones. Focusing of the camera tends to provide better images, particularly in low light situations where a larger aperture is necessary to provide adequate light or where a higher resolution picture is desirable. The need to use a flash is mitigated by facilitating the use of larger apertures. Since less use of a flash is facilitated, the batteries of the personal electronic device tend to have longer lives.

Embodiments described above illustrate, but do not limit, the invention. It should also be understood that numerous modifications and variations are possible in accordance with the principles of the present invention. Accordingly, the scope of the present invention is fully commensurate with the following claims and their functional equivalents.

What is claimed is:

1. A method, comprising:
providing a variable current through a coil; and
moving an optical element, based on the current, with respect to an image sensor, the optical element being disposed on a stage comprising a magnet resiliently suspended adjacent to the coil for movement relative to the coil; and wherein
the coil is wound around an axis that is perpendicular to a direction of movement of the optical element; and
the direction of movement of the optical element comprises a direction of movement toward and/or away from the image sensor along an optical axis of the optical element.

2. The method of claim 1, wherein:
the optical element comprises a lens disposed on a ring shaped lens mount;
the lens mount is disposed on the stage; and
the stage is constrained by a snubber mechanism against movement other than rectilinear movement along an axis that is parallel to an optical axis of the lens.

3. The method of claim 1, wherein the stage comprises a micro
electromechanical systems (MEMS) stage.

4. The method of claim 1, wherein
the stage moves with the optical element; and
the stage remains within a plane defined by the stage itself when the stage moves.

5. The method of claim 4, wherein the magnet and the optical element are disposed on opposite sides of the stage.

6. The method of claim 1, further comprising:
providing a housing around the optical element; and
attaching the coil to the housing, whereby the coil is aligned relative to the magnet by the housing.

7. The method of claim 1, further comprising controlling the current through the coil using a processor to adjust the focus of an image on the image sensor.

8. A device, comprising:
an imaging sensor;
a coil;
circuitry for providing a variable current through the coil; and
an optical element disposed on a stage comprising a magnet resiliently suspended adjacent to the coil for movement relative to the coil; and wherein
the coil is wound around an axis that is perpendicular to a direction of movement of the optical element; and
the direction of movement of the optical element comprises a direction of movement toward and/or away from the imaging sensor along an optical axis of the optical element.

9. The device of claim 8, wherein the optical element comprises a lens disposed on a ring shaped lens mount, wherein the lens mount is disposed on the stage, and wherein the stage is constrained by a snubber mechanism against movement other than rectilinear movement along an axis that is parallel to an optical axis of the lens.

10. The device of claim 8, wherein the stage comprises a micro electromechanical systems (MEMS) stage.

11. The device of claim 8, wherein:
the stage moves with the optical element; and
the stage remains within a plane defined by the stage itself when the stage moves.

12. The device of claim 8, wherein the magnet and the optical element are attached to the stage in a planar fashion.

13. The device of claim 12, wherein the magnet and the optical element are disposed on opposite sides of the stage.

14. The device of claim 8, further comprising:
a housing around the optical element; and wherein
the housing holds the coil and aligns the coil relative to the magnet.

15. A method, comprising:
coupling an optical element to a magnet via a stage; and
suspending the magnet adjacent to a coil via the stage so that the optical element and the magnet move conjointly in response to a variable current through the coil; and wherein
the coil is wound around an axis that is perpendicular to a direction of movement of the optical element; and
the direction of movement of the optical element comprises a direction of movement toward and/or away from an imaging sensor along an optical axis of the optical element.

16. The method of claim 15, wherein:
the optical element comprises a lens disposed on a ring shaped lens mount;
the lens mount is disposed on the stage; and
the stage is constrained by a snubber mechanism against movement other than rectilinear movement along an axis that is parallel to an optical axis of the lens.

17. The method of claim 15, wherein the stage comprises a micro electromechanical systems (MEMS) stage.

18. The method of claim 15, wherein the stage remains within a plane defined by the stage itself when the stage moves conjointly with the magnet and the optical element.

19. The method of claim 15, wherein the step of coupling the optical element to the magnet via the stage comprises assembling the stage, the magnet, and the optical element in a stacked fashion.

20. The method of claim 19, wherein the magnet and the optical element are disposed on opposite sides of the stage.

21. The method of claim 15, further comprising:
providing a housing around the optical element; and
attaching the coil to the housing, whereby the coil is aligned relative to the magnet by the housing.

* * * * *